(12) United States Patent  (10) Patent No.: US 7,401,512 B2
Kalix et al.  (45) Date of Patent: Jul. 22, 2008

(54) SOLID STATE ILLUMINATOR FOR BI-COLOR PORTED WATER LEVEL GAUGES

(75) Inventors: David Kalix, Dartmouth (CA); John Spencer, Dartmouth (CA)

(73) Assignee: Fossil Steam Technologies Inc., Dartmouth, NS (CA)

( * ) Notice: Subject to any disclaimer, the term of this patent is extended or adjusted under 35 U.S.C. 154(b) by 0 days.

(21) Appl. No.: 11/704,935

(22) Filed: Feb. 12, 2007

(65) Prior Publication Data

US 2007/0144252 A1 Jun. 28, 2007

Related U.S. Application Data

(60) Continuation of application No. 11/056,103, filed on Feb. 14, 2005, now Pat. No. 7,213,457, which is a division of application No. 10/487,868, filed as application No. PCT/CA03/01684 on Nov. 3, 2003, now Pat. No. 6,938,477.

(30) Foreign Application Priority Data

Nov. 4, 2002 (CA) .................................... 2410978

(51) Int. Cl.
    *G01F 23/00* (2006.01)
(52) U.S. Cl. ........................................ 73/293
(58) Field of Classification Search ............... 73/293, 73/328
    See application file for complete search history.

(56) References Cited

U.S. PATENT DOCUMENTS

| 2,024,815 | A | | 12/1935 | Blackburn | 73/293 |
| 2,115,889 | A | | 5/1938 | Steimel | 330/3 |
| 2,510,729 | A | | 6/1950 | Van Ham | 73/330 |
| 2,573,006 | A | * | 10/1951 | Good | 73/293 |
| 2,869,368 | A | * | 1/1959 | Brown | 73/304 R |
| 2,949,031 | A | * | 8/1960 | Bruni et al. | 73/331 |
| 3,119,268 | A | | 1/1964 | Stanley | 73/331 |
| 3,128,626 | A | | 4/1964 | Faber | 73/331 |
| 3,187,573 | A | | 6/1965 | Goeliner | 73/329 |
| 3,505,868 | A | * | 4/1970 | Goellner | 73/293 |
| 4,425,794 | A | | 1/1984 | Duesbury | 73/293 |
| 4,450,722 | A | | 5/1984 | Keyes, IV et al. | 73/293 |
| 4,633,711 | A | | 1/1987 | Hipple et al. | 73/293 |
| 4,733,335 | A | | 3/1988 | Serizawa et al. | 362/503 |
| 4,813,759 | A | | 3/1989 | Chappell | 340/531 |
| 4,836,022 | A | | 6/1989 | Zhang | 73/293 |
| 4,857,894 | A | * | 8/1989 | Dahl | 340/619 |
| 4,877,668 | A | | 10/1989 | Hinz et al. | 428/68 |

(Continued)

FOREIGN PATENT DOCUMENTS

CA 1 250 462 2/1989

(Continued)

*Primary Examiner*—Hezron E. Williama
*Assistant Examiner*—Tamiko D Bellamy
(74) *Attorney, Agent, or Firm*—Jacobson Holman PLLC (57) ABSTRACT

A solid state illuminator and display are provided for bi-colored ported water level gauges suitable for use in high pressure steam drums or similar water/steam devices to facilitate making an accurate determination of water level in such devices. The illuminator includes an array of bi-colored solid state light emitting diodes (LEDs), as the light source, and a precision lens to focus the light provided from the LEDs through a gauge body and onto a viewing screen.

37 Claims, 5 Drawing Sheets

U.S. PATENT DOCUMENTS

| | | | | |
|---|---|---|---|---|
| 4,961,069 A | * | 10/1990 | Tsaprazis | 340/619 |
| 5,063,778 A | * | 11/1991 | Jorritsma | 73/299 |
| 5,072,616 A | | 12/1991 | Sherrick | 73/293 |
| 5,660,461 A | | 8/1997 | Ignatius et al. | 362/241 |
| 5,747,824 A | * | 5/1998 | Jung et al. | 250/577 |
| 6,033,087 A | | 3/2000 | Shozo et al. | 362/244 |
| 6,043,505 A | | 3/2000 | Ames et al. | 250/577 |
| 7,047,806 B2 | | 5/2006 | Kowalski et al. | 73/293 |

FOREIGN PATENT DOCUMENTS

| | | |
|---|---|---|
| CA | 2 186 805 | 6/1997 |
| DE | 39 29 125 | 3/1990 |
| DE | 198 00 770 | 12/1998 |
| DE | 19800770 A1 * | 12/1998 |
| EP | 777111 A1 * | 6/1997 |
| FR | 1 374 848 A | 10/1964 |
| GB | 392882 A | 5/1933 |
| GB | 836172 A | 6/1960 |
| JP | 62044630 | 2/1987 |
| JP | 2003-172651 A | 6/2003 |

* cited by examiner

SOLID STATE ILLUMINATOR FOR BI-COLOR PORTED WATER LEVEL GAUGES

CROSS-REFERENCE TO RELATED APPLICATIONS

This is a continuation of application Ser. No. 11/056,103 filed Feb. 14, 2005 now U.S. Pat. No. 7,213,457, which is a divisional application of patent application, U.S. Ser. No. 10/487,868 filed Feb. 26, 2004, now U.S. Pat. No. 6,938,477 with issue date Sep. 6, 2005, which is a national stage entry of PCT/CA03/01684, filed Nov. 3, 2003, and is entitled to and hereby claims the priority thereof.

FIELD OF THE INVENTION

The present invention relates, generally, to a device for accurate determination of water level in a high pressure boiler drum or other similar water/steam apparatus. More specifically, the present invention utilizes an array of vertically arranged, bi-colored, solid state light emitting diodes (LEDs) to provide light that is focused through an array of precision lenses and projected through either steam or water and displayed upon a view screen. The presence of either steam or water at a level corresponding to each LED in the array of LEDs will result in a clear and unmistakable color change observable on the view screen.

BACKGROUND OF THE INVENTION

The design and use of bi-colored light for determining water levels in steam boilers is well taught and documented in the art. Traditionally, incandescent light is passed through colored lenses as the light source. These designs suffer from numerous deficiencies in their fragility, efficiency, power requirements and life span. An incandescent light source utilizes a fragile filament operating at high temperature. This filament can easily become damaged and break when subjected to continued vibration. In addition, the high operating temperature of the filament limits the life span of the incandescent light. The same incandescent light source requires a high level of power to operate and only a small percentage of this power is converted to usable light. The remaining power is lost, predominantly as heat.

Numerous liquid level indicators can be found in the art to which the present invention provides advances. U.S. Pat. No. 2,510,729 describes an indicating gauge in which a vertical column containing both water and steam includes a multitude of bores which pass horizontally through the column and allow for visual inspection of the contents of the column present at the corresponding level. An operator is able to inspect and determine the level at which the contents of the column shift from water to steam.

In U.S. Pat. Nos. 2,024,815 and 2,115,889, indicators that utilize the reflective and refractive properties of water, steam and light are revealed. In each case, the operator inspects the individual gauges within a plurality of gauges and is able to determine the water/steam level by observing a color change associated with the level corresponding to the change from water to steam. The device of U.S. Pat. No. 2,115,889 provides an additional means to visually inspect the gauge at a greater distance, more specifically, at a position located far below the gauge. The light is provided in each of these devices via an incandescent light source.

U.S. Pat. No. 4,836,022 describes a bi-color fluviograph for use in steam boilers and provides improvement to the intensity of light provided from the light source and includes benefits aimed at reducing the frequency of maintenance of the fluviograph. The light is provided by a flourescent lamp and the colors are introduced via two planes, one painted red, and the other green. The fluviograph increases the intensity of the red light to allow for its operation in murky or turbulent water conditions that would render most previous devices inoperable. A further advantage is that the device need not be cleaned as frequently. Traditionally, the impurities in the water contained within the boiler would deposit on the lens and gradually reduce the effective light transmitted. This effect is lessened by increasing the light intensity.

SUMMARY OF THE INVENTION

The present invention provides a gauge system that incorporates a solid state illuminator and corresponding view screen, which can help accurately determine the water level in steam boilers or similar devices, and do so in a safe, economical, and efficient manner.

The use of light emitting diodes as a light source in a level gauge illuminator provides reduced operating costs in that much or virtually all power is converted to visible light. In addition, the nominal life of an LED is 100,000 hours. An LED is unaffected by continued vibration. An LED is capable of producing red and green light directly, eliminating the need for colored glass. Finally, an LED requires minimal power to operate and the use of a solid state illuminator would be intrinsically safe in a hazardous environment.

According to an aspect of the present invention, there is provided a bi-color ported water level gauge for use in determining the water level in a steam/water environment, for instance in a boiler steam drum. The bi-color ported water level gauge includes an electronic printed circuit board containing an array of high-intensity, narrow beam, red/green light emitting diodes, the electronic printed circuit board being mounted on an electronics divider board; a divider board having a plurality of viewing ports that are individually aligned with the light emitting diodes, and preferably substantially equal in number thereto; a heat divider for protecting the printed circuit board from high temperatures existing at the water level gauge; an external housing having rows of offset slots to reduce heat transmission; and a display means, such as a view screen, onto which light originating from the light emitting diodes is projected for inspection by an operator.

According to another aspect of the present invention, there is provided a bi-color ported water level gauge illuminator for use in determining the water level in a steam/water environment, for instance in a boiler steam drum. The bi-color ported water level gauge illuminator includes an electronic printed circuit board containing an array of high-intensity, narrow beam, red/green light emitting diodes, the electronic printed circuit board being mounted on an electronics divider board; a divider board having a plurality of viewing ports that are individually aligned with the light emitting diodes, and preferably substantially equal in number thereto; a heat divider for protecting the printed circuit board from high temperatures existing at the water level gauge; and an external housing having rows of offset slots to reduce heat transmission.

According to a further aspect of the present invention, there is provided a bi-color ported water level gauge for use in determining the water level in a steam/water environment, for instance in a boiler steam drum. The bi-color ported water level gauge includes an electronic printed circuit board containing an array of high-intensity, narrow beam, red/green light emitting diodes, the electronic printed circuit board being mounted on an electronics divider board; a lens divider board having a plurality of viewing ports, each containing focusing lenses, such as a plano-convex lens, for focusing light originating from the light emitting diodes, the ports being individually aligned with the light emitting diodes, and preferably substantially equal in number thereto; a heat divider for protecting the printed circuit board from high temperatures existing at the water level gauge; an external housing having rows of offset slots to reduce heat transmission; and a display means, such as a view screen, onto which light originating from the light emitting diodes is projected for inspection by an operator.

According to another aspect of the present invention, there is provided a bi-color ported water level gauge illuminator for use in determining the water level in a steam/water environment, for instance in a boiler steam drum. The bi-color ported water level gauge illuminator includes an electronic printed circuit board containing an array of high-intensity, narrow beam, red/green light emitting diodes, the electronic printed circuit board being mounted on an electronics divider board; a lens divider board having a plurality of viewing ports, each containing focusing lenses, such as a piano-convex lens, for focusing light originating from the light emitting diodes, the ports being individually aligned with the light emitting diodes, and preferably substantially equal in number thereto; a heat divider for protecting the printed circuit board from high temperatures existing at the water level gauge; and an external housing having rows of offset slots to reduce heat transmission.

A further aspect of the invention provides a method for determining the water level in a boiler steam heater, or similar water/steam device. The method includes the steps of projecting a first light from one or more light emitting diodes of a first color; projecting a second light from one or more light emitting diodes of a second color; passing the first and second lights though a column containing steam and water at a varying level onto a projection screen positioned on an opposing side of the column relative to the light emitting diodes while protecting the light emitting diodes from heat generated at the column; observing the position of the first and second light on the projection screen at varying vertical levels along the column; and determining the presence of water or steam at each of the varying vertical levels based upon the observed positions of the first and second lights on the projection screen.

BRIEF DESCRIPTION OF THE DRAWINGS

FIG. 3b is a completed, perspective view of the illuminator of FIG. 3a.

DETAILED DESCRIPTION OF THE INVENTION

The system of the present invention comprises two main components: an illuminator, and a level display.

Figure 1A:
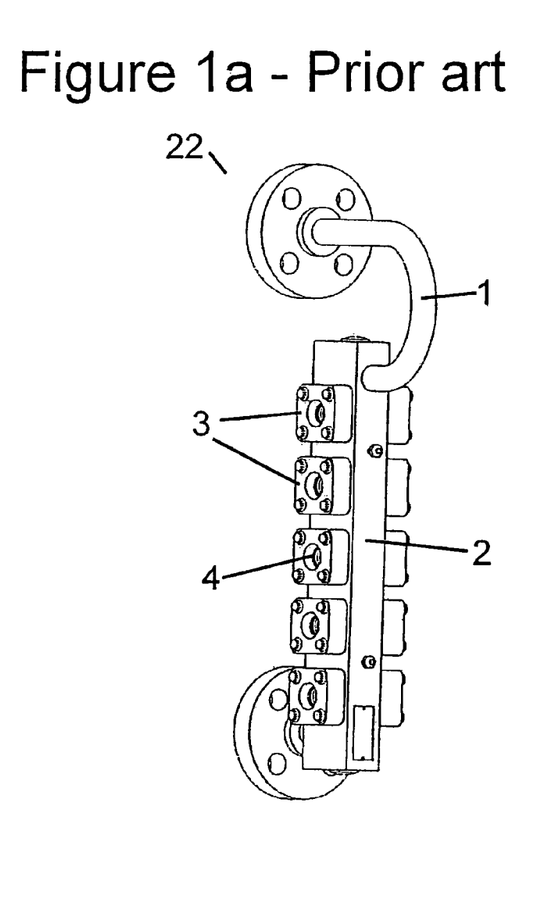
FIG. 1a is a perspective view of a conventional water level gauge, demonstrating a vertical array of viewing ports.
Figure 1B:
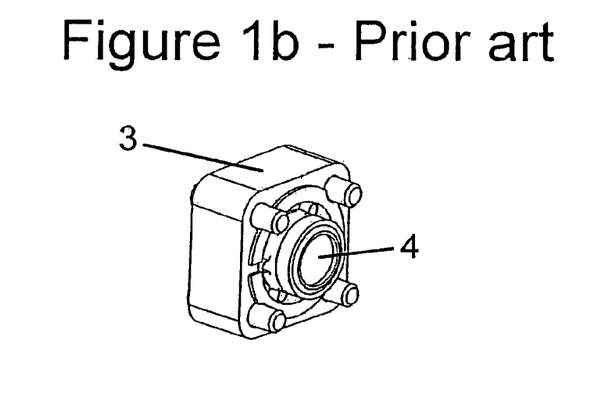
FIG. 1b is a perspective view of an individual port.
Figure 1C:
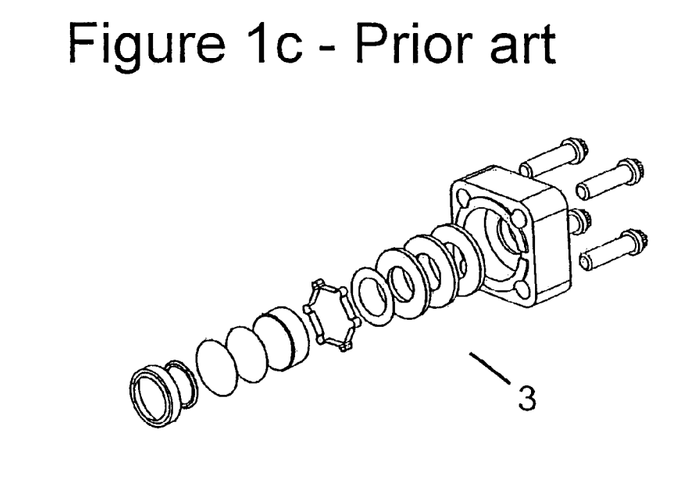
FIG. 1c is a exploded, perspective view of an individual port.

These two main components interact with a conventional water level gauge 22 as can be seen in FIG. 1A. A conventional water level gauge 22 is made up of a series of ports 3, arranged vertically along a column 2, each comprising an opening 4 protected by glass, though which light may pass. When installed on a water boiler, or similar device, water or steam or a combination of the two will pass from the boiler, through the pipe 1, and into the column 2. An operator, who wishes to inspect the column 2 may peer through the series of ports 3, and determine the level of water within the gauge, and correspondingly, the boiler.

Figure 2A:
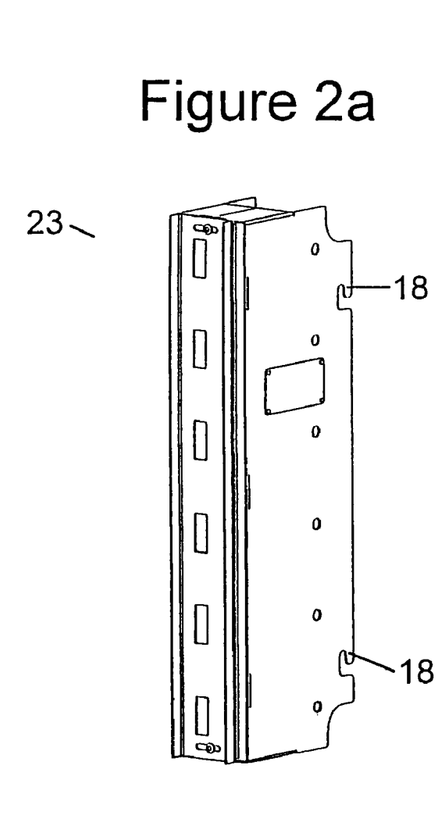
FIGS. 2a, 2b, and 2c constitute a perspective view of a system according to an embodiment of the present invention including the component parts, from left to right, of a level display, a level gauge, and an illuminator.
Figure 2B:
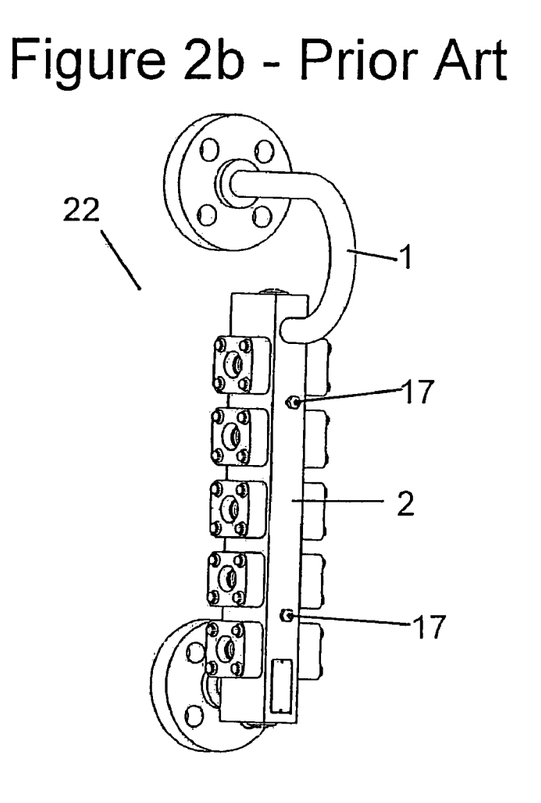
Figure 2C:
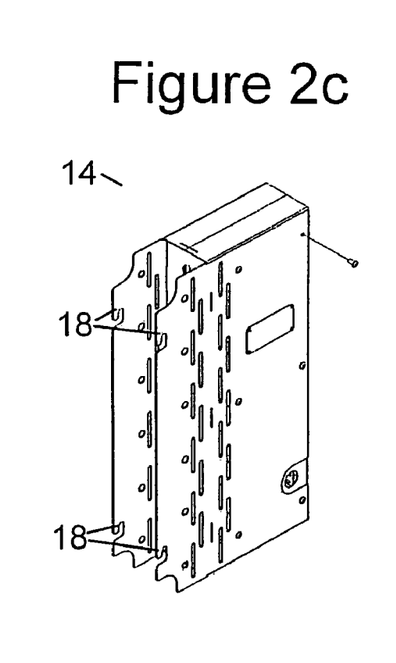

As can be seen in FIGS. 2a, 2b, and 2c, an illuminator 14 and level display 23 interact with a level gauge 22 by an interface that is formed between hooks 18 on the outer housings of the illuminator and the level display and a bolt 17 on the column 2 of the level gauge.

Figure 3A:
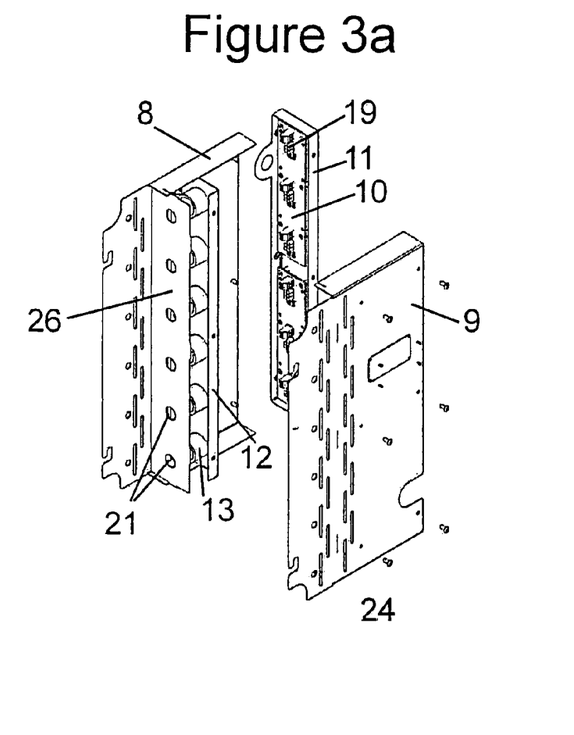
FIG. 3a is an exploded, perspective view of an illuminator according to an embodiment of the present invention.
Figure 3B:
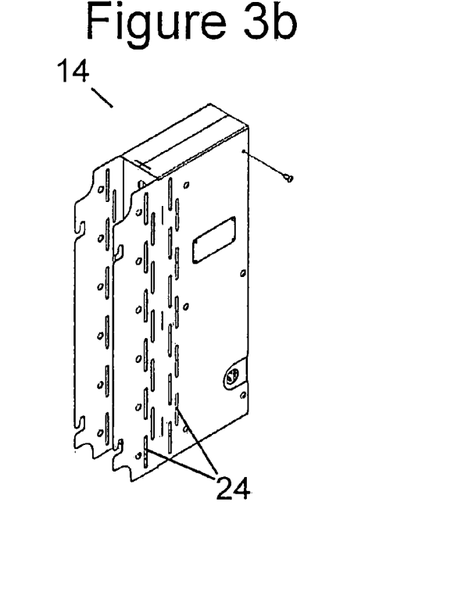
Figure 3C:
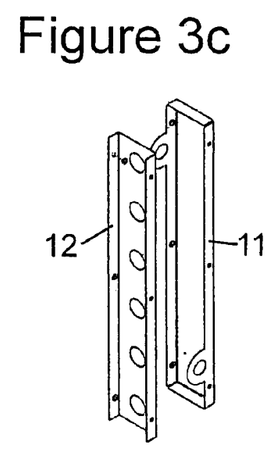
FIG. 3c is an exploded, perspective view of an electronics divider board, and a lens divider board according to an embodiment of the present invention.

Referring to FIGS. 3a-3e, the illuminator may comprise an electronic printed circuit board (PCB) 10 containing an array of red and green light emitting diodes (LEDs) 19, an array of piano-convex lenses 13, equal in number to the number of LEDs 19, and an external housing 20, made up of a first portion 8 and a second portion 9, adapted for attachment to a conventional water level gauge. The light emitting diodes may be configured in a paired linear array mounted along the longitudinal axis of the electronic PCB as shown in FIG. 3a, with one first color and one second color light emitting diode in each pair being mounted adjacent to each other along the lateral axis of the electronic PCB 10. Further, the first and second color light emitting diodes are preferably configured with at least two lights emitting diodes of the first color in parallel for independent operation, and at least two light emitting diodes of the second color in parallel for independent operation.

The PCB 10 utilizes precision resistors to regulate the current supplied to each LED 19. The PCB further utilizes a terminal block corresponding to each LED 19 that provides a connection point for the input power and allows for jumpering between individual PCBs 10. The PCB 10 is mounted on an electronics divider 11 which is, in turn, attached to the first portion 8 and second portion 9 of the external housing 20. A lens divider board 12 is positioned adjacent to the array of LEDs 19, and is attached to the first and second portions 8, 9 of the outer housing. This lens divider board 12, has a number of plano-convex lenses 13, equal to the number of LEDs 19 present on the PCB 10. These lenses 13 focus light through an equal number of holes 21 in a heat divider 26 mounted on the first portion 8 of the external housing 20 so as to provide light to be passed through a level gauge.

Figures 3D, 3E:
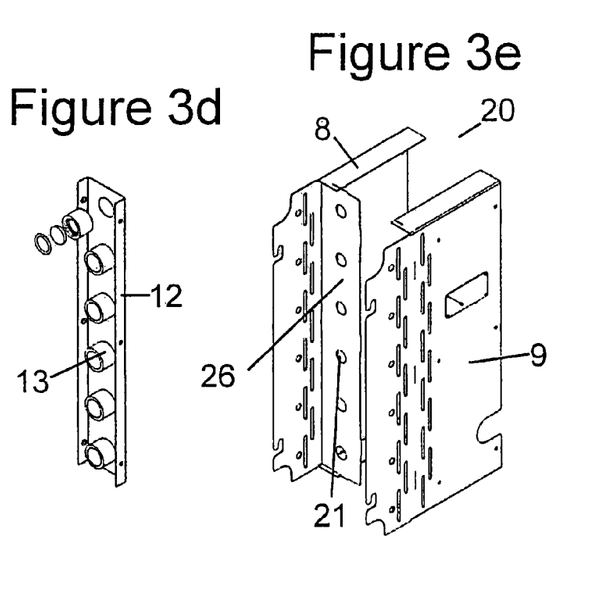
FIG. 3d is a perspective view of the lens divider board of FIG. 3c, including an array of lenses, one lens of which is presented in an exploded view.
FIG. 3e is an exploded perspective view of external housing of the illuminator according to an embodiment of the present invention.

The first and second portions 8, 9 of the illuminator housing 20 further include an array of offset slots 24 extending substantially completely from top to bottom. These slots 24 are designed and offset to limit the transmission of heat originating in the level gauge. The typical operating environment of a level gauge for a steam boiler is very high, typically in the range of 696 degrees F. (369 degrees Celsius). By introducing these slots to the design, heat transmission by conduction from the level gauge to the PCB board assembly and the LEDs is reduced, and the LEDs are isolated from these high operating temperatures.

Figure 4A:
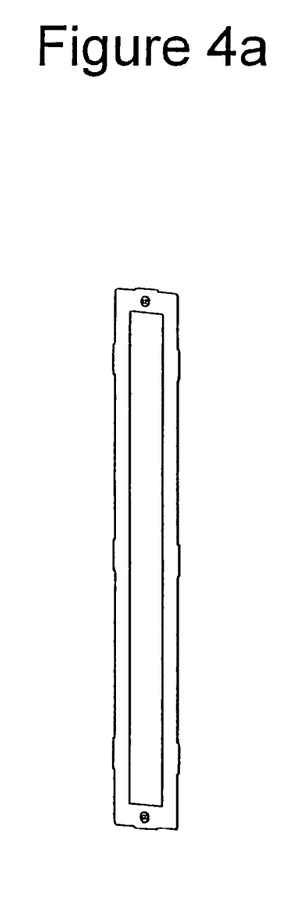
FIG. 4a is a perspective view of an inner display end plate according to an embodiment of the present invention.
Figure 4B:
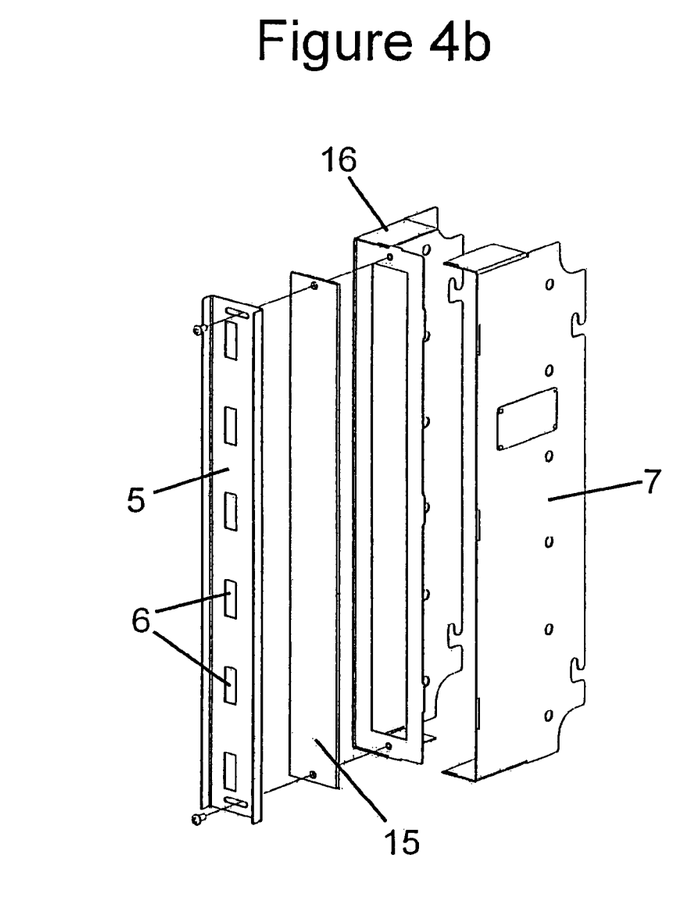
FIG. 4b is an exploded, perspective view of a level display according to an embodiment of the present invention.
Figure 4C:
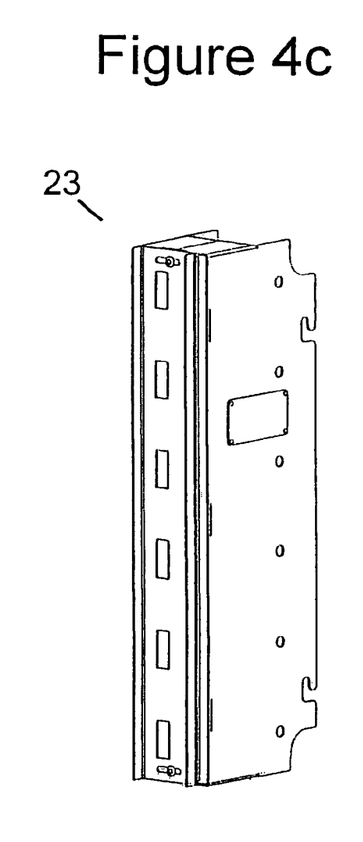
FIG. 4c is a completed, perspective view of the level display of FIG. 4b.

Referring now to FIGS. 4a, 4b, and 4c, the level display 23 may comprise a viewing screen 15 for viewing the light transmitted from the LEDs, having passed through a conventional water level gauge, an adjustable end plate 5 for blocking the unused red and green images, and a first portion 16 and second portion 7 of an external housing adapted for attachment to a conventional water level gauge. An adjustable end plate 5 provides openings 6 at the levels of concern and blocks the display of unwanted red and green light. The adjustable end plate 5 ensures that the operator can clearly distinguish between the levels and reduces error.

Figure 5:
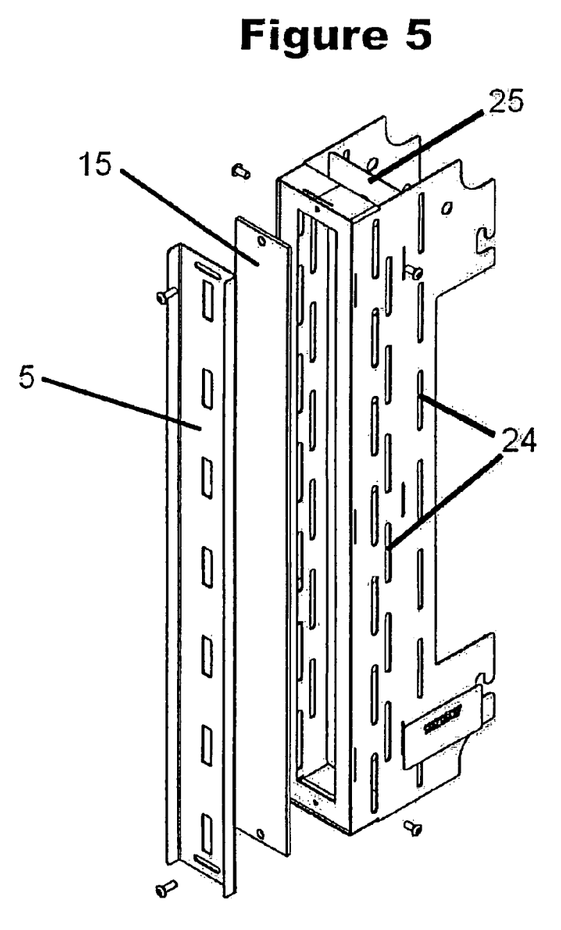
FIG. 5 is an exploded, perspective view of a level display according to a second embodiment of the present invention.
Figure 6:
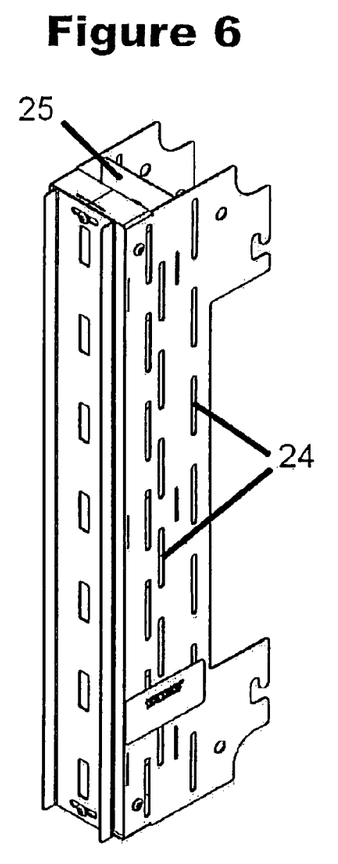
FIG. 6 is a completed, perspective view of the level display of FIG. 5.

Referring now to FIGS. 5 and 6, a second heat divider 25 is provided for reducing the transmission of heat from the level gauge 22 to the view screen 15. Additionally, an array of offset slots 24 extends substantially completely from top to bottom of the level display 23. These slots 24 are designed and offset to limit the transmission of excess heat originating in the level gauge 22, which may impair the functionality of the display.

INDUSTRIAL APPLICABILITY

The bi-color water level gauge and illuminator device taught herein generally provides an improved means for determining the water level in a boiler steam drum, heater, or similar water/steam device.

We claim:

1. A liquid level gauge, comprising:
   a housing having a first end and a second end;
   a liquid column connected to the first end of the housing, the liquid column including a plurality of viewing ports; and
   a light source connected to the second end of the housing, the light source including a plurality of light emitting diodes (LEDs), half of the LEDs emitting a first color light and half of the LEDs emitting a second color light, at least one pair of bi-color LEDs corresponding to each viewing port, and each pair of bi-color LEDs being oriented with respect to the corresponding viewing port in such a way that the first color light passes through the corresponding viewing port when a liquid is present in the corresponding viewing port and the second color light passes through the corresponding viewing port when a non-liquid is present in the corresponding viewing port.

2. The liquid level gauge of claim 1, wherein each light emitting diode (LED) emitting the first color light is a green LED and each LED emitting the second color light is a red LED.

3. The liquid level gauge of claim 1, wherein a focusing lens is provided for focusing the light emitted from each LED towards the corresponding viewing port.

4. The liquid level gauge of claim 3, wherein each focusing lens is housed within a lens divider board.

5. The liquid level gauge of claim 1, wherein a plurality of pairs of bi-color LEDs are provided as arrays of bi-color LEDs corresponding to each viewing port.

6. The liquid level gauge of claim 5, wherein each array of bi-color light emitting diodes corresponding to each viewing port includes three LEDs of the first color light and three LEDs of the second color light.

7. The liquid level gauge of claim 6, wherein a focusing lens is provided for focusing the light emitted from each LED towards the corresponding viewing port, the number of lenses corresponding to the number of arrays of bi-color LEDs, each lens being housed within a lens divider board.

8. The liquid level gauge of claim 1, further comprising a heat divider for separating the LEDs from exposure to high temperatures existing at the liquid column.

9. The liquid level gauge of claim 8, wherein the heat divider includes a metal heat shield positioned between the liquid column and the LEDs, the heat shield defining at least one opening to permit the first color light and second color light to pass from the LEDs through to the viewing ports.

10. The liquid level gauge of claim 1, wherein the housing defines an array of offset slots extending substantially completely from top to bottom at or near the first end thereof.

11. The liquid level gauge of claim 1, further comprising a level display for viewing the light transmitted from the LEDs and through the viewing ports of the liquid column, the level display comprising;
   a display housing having a first end and a second end, the display housing being attached to the liquid column at the first end thereof; and
   a viewing screen at the second end of the display housing upon which the light may be displayed for viewing by an observer.

12. The liquid level gauge of claim 11, wherein the level display further comprises an end plate adjustably mounted to the second end of the display housing, the end plate defining openings positioned along the length thereof in alignment with the viewing ports of the liquid column.

13. The liquid level gauge of claim 11, wherein the display housing defines an array of offset slots extending substantially completely from top to bottom at or near the first end thereof.

14. The liquid level gauge of claim 11, wherein the display housing further comprises a heat divider for separating the viewing screen from exposure to high temperatures existing at the liquid column.

15. The liquid level gauge of claim 14, wherein the heat divider of the display housing includes a metal heat shield positioned between the liquid column and the viewing screen, the heat shield defining at least one opening to permit the first color light and the second color light to pass from the viewing ports through to the viewing screen.

16. The liquid level gauge of claim 1, wherein the liquid is water.

17. An illuminator for a liquid level gauge, the liquid level gauge including a housing having a first end and a second end and a liquid column connected to the first end of the housing, the liquid column including a plurality of viewing ports, the illuminator comprising:
   a light source including a plurality of LEDs for connection to the second end of the housing;
   half of said plurality of LEDs emitting a first color light and half of the LEDs emitting a second color light;
   at least one pair of bi-color LEDs corresponding to each viewing port; and
   each pair of bi-color LEDs being oriented with respect to the corresponding viewing port in such a way that the first color light passes through the corresponding viewing port when a liquid is present in the corresponding viewing port and the second color light passes through the corresponding viewing port when a non-liquid is present in the viewing port.

18. The illuminator of claim 17, wherein each LED emitting the first color light is a green LED and each LED emitting the second color light is a red LED.

19. The illuminator of claim 17, wherein a plurality of pairs of bi-color LEDs are provided as arrays of bi-color LEDs corresponding to each viewing port.

20. The illuminator of claim 19, wherein each array of bi-color LEDs corresponding to each viewing port includes three LEDs of the first color light and three LEDs of the second color light.

21. The illuminator of claim 17, wherein the liquid is water.

22. An illuminator for a liquid level gauge, the illuminator including a housing having a front end and a rear end, the front end adapted for connection to a liquid column having a plurality of viewing ports, the illuminator comprising;
  a light source including a plurality of LEDs connected to the rear end of the housing;
  half of said plurality of LEDs emitting a first color light and half of the LEDs emitting a second color light;
  at least one pair of bi-color LEDs corresponding to each viewing port; and
  each pair of bi-color LEDs being oriented with respect to the corresponding viewing port in such a way that the first color light passes through the corresponding viewing port when a liquid is present in the corresponding viewing port and the second color light passes through the corresponding viewing port when a non-liquid is present in the corresponding viewing port.

23. The illuminator of claim 22, wherein each LED emitting the first color light is a green light LED and each LED emitting the second color light is a red LED.

24. The illuminator of claim 22, wherein a focusing lens is provided for focusing the light emitted from each LED towards the corresponding viewing port.

25. The illuminator of claim 24, wherein each focusing lens is housed within a lens divider board.

26. The illuminator of claim 22, wherein a plurality of pairs of bi-color LEDs are provided as arrays of bi-color LEDs corresponding to each viewing port.

27. The illuminator of claim 26, wherein each array of bi-color LEDs corresponding to each viewing port includes three LEDs of the first color light and three LEDs of the second color light.

28. The illuminator of claim 27, wherein a focusing lens is provided for focusing the light emitted from each LED towards the corresponding viewing port, the number of lenses corresponding to the number of arrays of bi-color LEDs, each lens being housed within a lens divider board.

29. The illuminator of claim 22, further comprising a heat divider for separating the LEDs from exposure to high temperatures existing at the liquid column.

30. The illuminator of claim 29, wherein the heat divider includes a metal heat shield positioned between the front end of the housing and the LEDs, the heat shield defining at least one opening to permit the first color light and second color light to pass from the LEDs through to the viewing ports of the liquid column.

31. The illuminator of claim 22, wherein the housing defines an array of offset slots extending substantially completely from top to bottom at or near the first end thereof.

32. The illuminator of claim 22, wherein the liquid is water.

33. A level display for displaying light transmitted from a bi-color illuminator through viewing ports of a liquid column, said bi-color illuminator emitting first color light and second color light, the level display comprising:
  a display housing having a first end and a second end, the display housing being adapted for attachment to the liquid column at the first end thereof; and
  a viewing screen at the second end of the display housing upon which the light may be displayed for viewing by an observer.

34. The level display of claim 33, wherein the level display further comprises an end plate adjustably mounted to the second end of the display housing, the end plate defining openings positioned along the length thereof in alignment with the viewing ports of the liquid column.

35. The level display of claim 33, wherein the display housing defines an array of offset slots extending substantially completely from top to bottom at or near the first end thereof.

36. The level display of claim 33, wherein the display housing further comprises a heat divider for separating the viewing screen from exposure to high temperatures existing at the liquid column.

37. The level display of claim 36, wherein the heat divider of the display housing includes a metal heat shield positioned between the liquid column and the viewing screen, the heat shield defining at least one opening to permit the first color light and the second color light to pass from the viewing ports through to the viewing screen.

* * * * *